(12) United States Patent
Wang et al.

(10) Patent No.: US 9,100,110 B2
(45) Date of Patent: Aug. 4, 2015

(54) NON-LINEAR INTERFERENCE CANCELLATION WITH MULTIPLE AGGRESSORS

(71) Applicant: QUALCOMM Incorporated, San Diego, CA (US)

(72) Inventors: Jibing Wang, San Diego, CA (US); Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 14/013,569

(22) Filed: Aug. 29, 2013

(65) Prior Publication Data

US 2015/0065058 A1    Mar. 5, 2015

(51) Int. Cl.
*H04B 1/10*         (2006.01)
*H04B 15/00*        (2006.01)

(52) U.S. Cl.
CPC *H04B 15/00* (2013.01); *H04B 1/10* (2013.01); *H04B 1/109* (2013.01)

(58) Field of Classification Search
CPC ...... H04B 1/10; H04B 1/1027; H04B 1/1081; H04B 1/109
USPC .................................. 455/296, 309, 310, 312
See application file for complete search history.

(56) References Cited

U.S. PATENT DOCUMENTS

| | | | | |
|---|---|---|---|---|
| 5,235,612 | A * | 8/1993 | Stilwell et al. | 375/144 |
| 6,968,171 | B2 * | 11/2005 | Vanderhelm et al. | 455/296 |
| 8,401,509 | B1 * | 3/2013 | Gupta et al. | 455/296 |
| 8,744,377 | B2 * | 6/2014 | Rimini et al. | 455/114.2 |
| 8,767,869 | B2 * | 7/2014 | Rimini et al. | 375/296 |
| 2007/0149242 | A1 * | 6/2007 | Kim et al. | 455/525 |
| 2009/0017770 | A1 * | 1/2009 | Mirzaei et al. | 455/73 |
| 2010/0029213 | A1 | 2/2010 | Wang | 455/63.1 |
| 2011/0124289 | A1 * | 5/2011 | Balachandran et al. | 455/63.1 |
| 2011/0149714 | A1 | 6/2011 | Rimini et al. | |
| 2012/0140685 | A1 * | 6/2012 | Lederer et al. | 370/286 |
| 2012/0140860 | A1 | 6/2012 | Rimini et al. | |
| 2012/0287968 | A1 | 11/2012 | Gainey et al. | |
| 2013/0040555 | A1 | 2/2013 | Rimini et al. | |
| 2013/0044791 | A1 | 2/2013 | Rimini et al. | |

* cited by examiner

*Primary Examiner* — Duc M Nguyen

(74) *Attorney, Agent, or Firm* — DeLizio Law, PLLC

(57) ABSTRACT

Disclosed is non-linear interference cancellation (NLIC) on a victim receiver in a communication system in which there is self-jamming interference from multiple aggressor transmitters. The victim receiver may implement cascaded NLIC operations using multiple interference signals in succession to remove the multiple interference signals from the Rx signal and to cancel or mitigate the self-jamming interference. The reconstruction and removal of the interference signals may be ordered based on the expected level of interference from the interference signals on the desired Rx signal. The victim receiver may first perform NLIC operation using the Tx signal from the transmitter aggressor estimated to generate the strongest interference signal to remove the strongest interference signal from the Rx signal first. The victim receiver may perform NLIC operation on the TX signal from the next strongest transmitter aggressor, and so on, to remove interference signals of multiple aggressor transmitters from the Rx signal.

36 Claims, 5 Drawing Sheets

NON-LINEAR INTERFERENCE CANCELLATION WITH MULTIPLE AGGRESSORS

TECHNICAL FIELD

This application generally relates to communication systems. In particular, this application relates to cancelling self-jamming interference induced by multiple transmitters on receivers of communication systems.

BACKGROUND

Wireless communication systems are widely deployed to provide various types of communication content such as voice, data, and so on. It is common to integrate multiple radios into a single communication system. For example, smartphones may have radios to support cellular communication, WiFi, GPS, and Bluetooth®, etc., with each radio operating on a different frequency band. Even for systems that have just a single radio, the radio may be a frequency division duplex (FDD) system in which the transmit (Tx) and receive (Rx) links simultaneously operate on different frequency bands. In these systems, the strongest interference on an Rx signal of a victim receiver may be induced by self-jamming leakage of Tx signals that are simultaneously transmitted by one or more aggressor transmitters of the systems. The Tx signals may leak to the Rx path through the finite isolation between the Tx and Rx paths. For example, in a system containing a 3GPP Long Term Evolution (LTE) radio and a WiFi radio, non-linearities present in the transmitter chain, such as in an up-converter or a power amplifier (PA) of the LTE transmitter, may generate spectral re-growth that falls in the Rx frequency band of the WiFi receiver as a leakage signal. Even when the Tx leakage signal occupies a different frequency band from the Rx signal, the Tx leakage signal may cause co-channel interference on the intended Rx signal due to non-linearities in the Rx chain. For example, non-linear behavior in the radio frequency (RF) down conversion components, such as non-linear excitation of low noise amplifiers (LNA), mixers, switches, filters, data converters, etc., operating on the Tx leakage signal may generate interference in the Rx frequency band. The effects of the self-jamming interference due to the non-linearities of the Tx or the Rx chains are degradation in the performance of the communication systems.

In a communication system affected by self-jamming interference, the Tx waveforms that generate the interference may be determined. Hence, the communication system may reconstruct the interference component of the Rx signal at the victim Rx chain via an adaptive non-linear interference cancellation (NLIC) scheme. For example, an NLIC module may generate, based on the baseband Tx signal of an aggressor transmitter, an estimate of the interference in the baseband Rx signal at a victim receiver due to the Tx/Rx non-linearities. The Rx chain may remove the estimated interference from the baseband Rx signal to cancel or to mitigate the interference.

Often, there may be self-jamming interference signals from multiple aggressor transmitters. For example, a multiple-input multiple-output (MIMO) LTE transceiver may transmit Tx signals on the same frequency from multiple antennas. Each of the antennas may generate an interference signal of different power to a victim receiver, such as a Wireless Local Area Network (WLAN) receiver. Another scenario for multiple self-jamming interference may occur in an LTE transceiver that uses uplink carrier aggregation, where different carriers of the uplink Tx bandwidth may generate multiple interference signals that are different harmonics of the carriers. For example, a third harmonic from a first carrier and a second harmonic from a second carrier may overlap with the Rx signal of a WLAN receiver. Multiple self-jamming interference signals may also be found in simultaneous transmissions from a Global System for Mobile (GSM) transceiver and an LTE transceiver of a smartphone, where the multiple interference signals on the victim receiver may be generated by different mechanisms. In these systems, the NLIC module of the victim receiver may attempt to reconstruct the interference component of the Rx signal by estimating an aggregate sum of the multiple interference signals from multiple Tx signals. However, estimating the sum of the multiple interference signals may become complex when the multiple interference signals are generated by different mechanisms and may be of different power. In addition, it may be difficult to scale such implementation as the number of interference signals changes. As such, there is a need for an NLIC solution that is simpler, scalable, and more robust when there are multiple aggressor transmitters.

SUMMARY

Disclosed are techniques for implementing non-linear interference cancellation (NLIC) on a victim receiver in a communication system in which there is self-jamming interference from multiple aggressor transmitters. Self-jamming interference from multiple aggressor transmitters may arise when leakage Tx signals from the multiple transmitters induce co-channel interference on the Rx signal of a victim receiver. The interference may be generated by non-linearities in the Tx chains of the transmitters or in the Rx chain of the victim receiver. A victim receiver may implement the NLIC operation in a cascaded architecture to reconstruct the multiple interference signals in succession and to successively remove the reconstructed interference signals from the Rx signal to cancel or mitigate the self-jamming interference. The reconstruction and removal of the interference signals may be ordered based on the expected level of interference from the interference signals. For example, the victim receiver may perform the NLIC operation on the interference signal deemed to be the strongest to reconstruct and remove the strongest interference signal first. The victim receiver may perform NLIC operation on the next strongest interference signal and so on.

The NLIC operation to reconstruct the interference signal from each of the multiple aggressor transmitters may be different to adapt to interference signals that may be generated by different mechanisms and may be of different power. By performing the NLIC of the multiple interference signals in a cascaded architecture, the complexity of the NLIC implementation is reduced compared to a parallel architecture that performs NLIC of the multiple interference signals simultaneously. In addition, the cascaded architecture is easily scalable to cancel or mitigate interference from a different number of interference signals, even when the number of interference signals changes dynamically. Furthermore, by performing the NLIC operation on the strongest interference signal first, the NLIC performance may remain robust even when there are a large number of interference signals.

A method for NLIC of interference signals from multiple aggressor transmitters by a victim receiver is disclosed. The method includes determining the expected level of interference on the victim receiver from each of the aggressor transmitters. The method also includes ordering the aggressor transmitters from the strongest aggressor transmitter having the highest expected level of interference to the weakest aggressor transmitter having the lowest expected level of interference. The method further includes receiving a composite Rx signal. The composite Rx signal includes a desired Rx signal and an interference component where the interference component includes the interference signal from each of the aggressor transmitters. The method further includes receiving a Tx signal from the strongest aggressor transmitter. The method further includes operating on the Tx signal from the strongest aggressor transmitter to perform NLIC of the interference signal from the strongest aggressor transmitter in the composite Rx signal.

An apparatus for NLIC of interference signals from multiple aggressor transmitters is disclosed. The apparatus includes a memory and one or more processors that execute instructions read from the memory. The processors execute the instructions to determine the expected level of interference on the apparatus from each of the aggressor transmitters. The processors also execute the instructions to order the aggressor transmitters from the strongest aggressor transmitter having the highest expected level of interference to the weakest aggressor transmitter having the lowest expected level of interference. The processors further execute the instructions to receive a composite Rx signal. The composite Rx signal includes a desired Rx signal and an interference component where the interference component includes the interference signal from each of the aggressor transmitters. The processors further execute the instructions to receive a Tx signal from the strongest aggressor transmitter. The processors further execute the instructions to operate on the Tx signal from the strongest aggressor transmitter to perform NLIC of the interference signal from the strongest aggressor transmitter in the composite Rx signal.

A non-transitory machine-readable medium that stores machine-readable instructions is disclosed. One or more processors may execute the instructions to perform steps for NLIC of interference signals from multiple aggressor transmitters. The instructions include determining the expected level of interference on a victim receiver from each of the aggressor transmitters. The instructions also include ordering the aggressor transmitters from the strongest aggressor transmitter having the highest expected level of interference to the weakest aggressor transmitter having the lowest expected level of interference. The instructions further include receiving a composite Rx signal. The composite Rx signal includes a desired Rx signal and an interference component where the interference component includes the interference signal from each of the aggressor transmitters. The instructions further include receiving a Tx signal from the strongest aggressor transmitter. The instructions further include operating on the Tx signal from the strongest aggressor transmitter to perform NLIC of the interference signal from the strongest aggressor transmitter in the composite Rx signal.

A system for NLIC of interference signals from multiple aggressor transmitters is disclosed. The system includes means for determining the expected level of interference on the system from each of the aggressor transmitters. The system also includes means for ordering the aggressor transmitters from the strongest aggressor transmitter having the highest expected level of interference to the weakest aggressor transmitter having the lowest expected level of interference. The system further includes means for receiving a composite Rx signal. The composite Rx signal includes a desired Rx signal and an interference component where the interference component includes the interference signal from each of the aggressor transmitters. The system further includes means for receiving a Tx signal from the strongest aggressor transmitter. The system further includes means for operating on the Tx signal from the strongest aggressor transmitter to perform NLIC of the interference signal from the strongest aggressor transmitter in the composite Rx signal.

BRIEF DESCRIPTION OF THE DRAWINGS

The present embodiments may be better understood, and numerous objects, features, and advantages made apparent to those skilled in the art by referencing the accompanying drawings.

Embodiments of the present disclosure and their advantages are best understood by referring to the detailed description that follows. it should be appreciated that like reference numerals are used to identify like elements illustrated in one or more of the figures.

DETAILED DESCRIPTION

Figure 1:
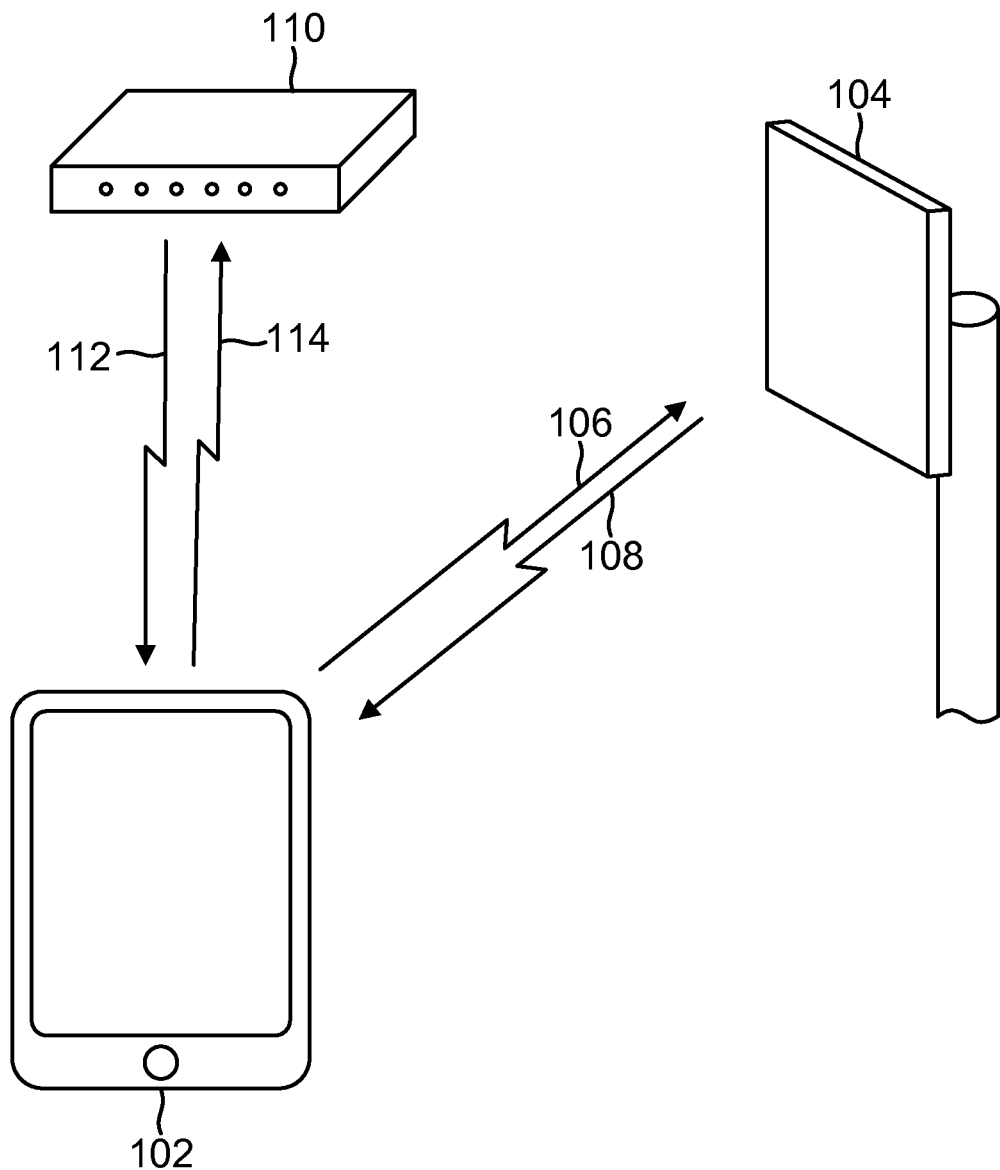
FIG. 1 shows multiple radios operating in a communication system in which non-linear interference cancellation of self-jamming interference signals from multiple transmitter aggressors may be implemented according to one or more embodiments of the present disclosure.

Systems and methods are disclosed for implementing cascaded non-linear interference cancellation (NLIC) on victim receivers in communication systems when there is self-jamming interference from multiple aggressor transmitters. A communication system may have multiple transceivers operating in different frequency bands in which Tx leakage signals from multiple transmitters induce self-jamming interference on an intended Rx signal of a victim receiver. For example, multiple transmitters of a MIMO LTE transceiver may transmit Tx signals on the same frequency from multiple antennas. Each antenna may transmit an interference signal that is the spectral re-growth of the Tx signal from the transmitter. The interference signals may be of different power and may fall within the frequency band of the intended Rx signal of a WLAN receiver.

The victim receiver may implement the NLIC operation in a cascaded architecture to successively reconstruct and remove the multiple interference signals from the Rx signal to cancel or mitigate the self-jamming interference. The reconstruction and removal of the interference signals may be ordered based on the expected level of interference on the intended Rx signal from the interference signals. The expected level of interference from the interference signal of an aggressor transmitter may depend on such factors as the Tx power from the aggressor transmitter, the antenna isolation from the aggressor transmitter to the victim receiver, the frequency of the Tx signal, etc. The victim receiver may first perform NLIC operation on the signal from a first transmitter aggressor estimated to generate the strongest interference signal. The NLIC operation may reconstruct the strongest interference signal using the Tx signal of the first transmitter aggressor and may remove the reconstructed strongest interference signal from the Rx signal of the victim receiver. After the interference caused by the strongest interference signal is removed or mitigated, the victim receiver may perform NLIC operation on the next strongest interference signal and so on. Thus, the NLIC operation may remove the reconstructed interference signal from the Rx signal from which stronger interference signals have been removed or mitigated. The NLIC operation to reconstruct the interference signals from the multiple aggressor transmitters may be different to adapt to interference signals that are generated by different mechanisms and of different power.

For example, for the WLAN receiver receiving interference from the multiple transmitters of the MIMO LTE transceiver, the WLAN receiver may perform a cascaded NLIC operation to successively reconstruct the interference signals using the LTE Tx signals and to successively remove the reconstructed interference signals from the WLAN Rx signal. The WLAN receiver may estimate the level of interference from the LTE interference signals based on calibration of the isolation from the LTE transmitters to the WLAN receiver, information on the power of the LTE transmitters, and information on the center frequency and bandwidth of the LTE Tx signals. The WLAN receiver may perform successive NLIC operations on the LTE interference signals starting from the interference signal estimated to be the strongest interference level to the interference signal estimated to be the weakest interference level. When the number of LTE transmitters and/or the Tx power of the LTE transmitters changes (e.g., a quantity of aggressor transmitters), the WLAN receiver may re-estimate the level of interference from the LTE interference signals to re-order the NLIC operations on the interference signals. Thus, the performance of the WLAN receiver may remain robust even when the number or the level of interference signals changes.

More generally, an aggressor transceiver of a communication system may include a digital backend that generates a Tx signal in baseband and an analog frontend that generates the Tx signal in RF from the baseband Tx signal. The RF Tx signal may leak to a victim transceiver of the communication system through finite isolation between the aggressor transceiver and the victim transceiver (e.g., through duplexer, antenna coupling, circuit electromagnetic interference (EMI), ground coupling). The victim transceiver may include an analog frontend that receives a composite RF signal comprising the desired Rx signal in an Rx frequency band and the RF Tx leakage signals from multiple aggressor transceivers. Self-jamming interference from the RF Tx leakage signals may arise when non-linearities in the Tx RF components of the analog frontend of the aggressor transceivers generate spectral re-growth of the RF Tx signals that overlap with the Rx frequency band. For example, a third harmonic distortion (H3D) of the Tx carrier signal $f_0$ from an RF up-converter of an aggressor transceiver may introduce spectral sideband at $3f_0$, which may fall in the Rx frequency band of the victim transceiver.

Even if the RF Tx leakage signals are in a different frequency band from the Rx frequency band of the victim transceiver, non-linearities in the RF components of the analog frontend of the victim transceiver operating on the RF Tx leakage signals may generate co-channel interference in the Rx frequency band. For example, $2^{nd}$ order intermodulation (IM2) distortion of the RF Tx leakage signals in a RF down-converter of the victim transceiver may introduce interference to the desired RF signal. If there is an additional external narrowband jamming signal, cross modulation of the RF Tx leakage signals with the jamming signal in the RF down-converter may also cause interference.

The interference signals may appear with the desired Rx signal in a composite digital baseband Rx signal from the output of the analog frontend of the victim transceiver. A digital backend of the victim transceiver may receive the composite digital baseband Rx signal to demodulate and decode the desired Rx signal. The interference signals reduce the signal to interference and noise ratio of the desired Rx signal, degrading performance of the victim transceiver, causing a decrease in throughput, and increasing the likelihood of a failed communication link.

To cancel or mitigate the interference due to the leakage signals from the multiple aggressor transceivers, the digital backend of the victim transceiver may receive the Tx signal from each aggressor transceiver as a digital baseband signal. The digital baseband Tx signal may be generated from the digital backend of an aggressor transceiver. The same digital baseband Tx signal may be converted into an analog baseband signal and sent to the analog frontend of the aggressor transceiver to be up-converted to the RF Tx signal. The digital backend of the victim transceiver may receive the digital baseband Tx signal from each aggressor transceiver as well as the composite digital baseband Rx signal from the analog frontend of the victim transceiver. The composite digital baseband Rx signal includes the desired Rx signal and the interference component that includes a composite of the interference signals from the aggressor transceivers.

The digital backend of the victim transceiver may successively remove the interference signals by adaptively estimating the non-linear interference signals in NLIC operations using the digital baseband Tx signals from the aggressor transceivers. For example, the victim transceiver may implement the NLIC operations in a cascaded architecture to successively estimate and remove the interference signals from the composite digital baseband Rx signal using the digital baseband Tx signals in an order from the strongest expected interference signal to the weakest. Each NLIC operation may process the digital baseband Tx signal to generate an estimate of the non-linear interference signal present in the composite digital baseband Rx signal due to the leakage of the RF Tx signal generated from the digital baseband Tx signal. The NLIC operation may be implemented in a digital adaptive filter that applies a non-linear distortion to the digital baseband Tx signal to construct an estimate of the non-linear interference signal. The digital backend may remove the estimate of the non-linear interference signal from the composite digital baseband Rx signal. The removal of the estimated non-linear interference signal from the composite baseband digital Rx signal may generate a residual interference signal. The residual interference signal may be minimized using a minimum square error (MSE) algorithm to generate an estimate of the non-linear interference signal that closely approximates the received non-linear interference signal present in the composite digital baseband Rx signal.

FIG. 1 shows multiple radios operating in a communication system in which non-linear interference cancellation of self-jamming interference signals from multiple transmitter aggressors may be implemented according to one or more embodiments of the present disclosure. A user terminal 102 communicates with a base station 104 over a first wireless network. User terminal 102 may be a smartphone, a tablet computer, a personal digital assistant (PDA), a notebook computer, a laptop, or other communication and/or computing devices. User terminal 102 may be stationary, portable, or mobile. User terminal 102 may also be referred to as a user equipment, a subscriber unit, a user node, a mobile station, or using other terminology. Base station 104 may be a base station in a cellular network, an access point (AP) in a WiFi network, or other stationary, portable, or mobile communication terminals. The first wireless communication network over which user terminal 102 and base station 104 communicate may be a multiple access network, a point-to-point network, a mesh network, etc. Examples of multiple access networks may include Code Division Multiple Access (CDMA), Time Division Multiple Access (TDMA), Frequency Division Multiple Access (FDMA), Orthogonal Frequency Division Multiple Access (OFDMA), etc., that are found in cellular, wide-area network (WAN), local-area network (LAN), personal-area network (PAN), etc. Systems and methods for NLIC discussed here may also be applicable to Global Positioning System (GPS), Ultra-wide band (UWB), radio frequency identifiers (RFID), or wired communication systems such as Ethernet, cable, fiber, power-line, etc.

User terminal 102 also communicates with an access point 110 over a WLAN network. However, similar to base station 104, access point 110 may also be a base station in a cellular network, an AP in a WiFi network, or other stationary, portable, or mobile communication terminals. User terminal 102 transmits data to base station 104 over multiple uplink carriers 106 using uplink carrier aggregation. In one or more embodiments, user terminal 102 may be a MIMO transceiver that transmits uplink Tx signals on the same frequency from multiple antennas. Base station 104 transmits data to user terminal 102 over a downlink 108. User terminal 102 also receives data from access point 110 over a downlink WiFi channel 112 and transmits data to access point 110 over an uplink WiFi channel 114. User terminal 102 may transmit data over multiple uplink carriers 106 simultaneously while receiving data over downlink WiFi channel 112. Self-jamming interference in user terminal 102 may occur when non-linearities in the Tx path or Rx processing of user terminal 102 cause Tx signals of multiple uplink carriers 106 to generate co-channel interfere in the Rx frequency band of downlink WiFi channel 112.

Figure 2A:
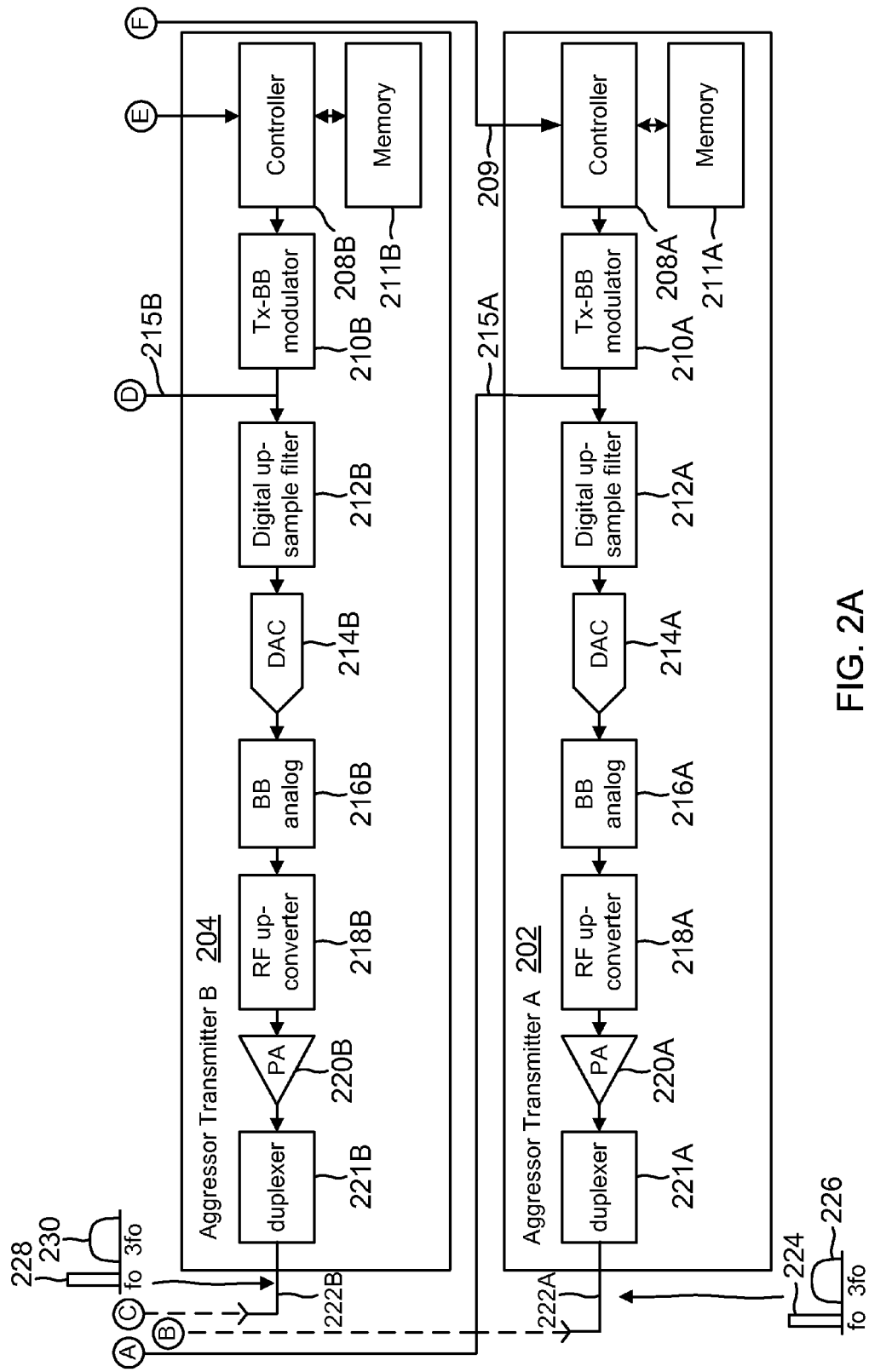
FIG. 2A shows a system block diagram of two aggressor transmitters of a communication system in which self-jamming interference signals from the two aggressor transmitters are received by a victim receiver that implements cascaded NLIC operations using baseband Tx signals from the two aggressor transmitters to mitigate the interference according to one or more embodiments of the present disclosure.

FIG. 2A shows a system block diagram of two aggressor transmitters of a communication system in which self-jamming interference signals from the two aggressor transmitters are received by a victim receiver that implements cascaded NLIC operations using baseband Tx signals from the two aggressor transmitters to mitigate the interference according to one or more embodiments of the present disclosure. The communication system of FIG. 2B may be found in user terminal 102 of FIG. 1.

The communication system includes an aggressor transmitter A 202, an aggressor transmitter B 204, and a victim receiver 206. Aggressor transmitter A 202 and aggressor transmitter B 204 may be two transmitters of a MIMO LTE transceiver. In one or more embodiments, aggressor transmitter A 202 and aggressor transmitter B 204 may transmit over two uplink carriers of an LTE uplink carrier aggregation system. Victim receiver 206 may be a receiver of a WLAN transceiver.

Aggressor transmitter A 202 includes a controller 208A, a Tx baseband (Tx-BB) modulator 210A, a digital up-sample filter 212A, and a digital-to-analog converter (DAC) 214A in a digital backend. Tx-BB modulator 210A performs coding, interleaving, and modulation, etc., of data from one or more data sources to generate digital baseband Tx data 215A under the control of controller 208A. Controller 208A may execute instructions stored in a memory 211A to control the generation of digital baseband Tx data 215A. Digital baseband Tx data 215A is routed as Tx data of aggressor transmitter A 202 to victim receiver 206 for reconstructing the interference signal from aggressor transmitter A 202 in NLIC operations. In addition, digital up-sample filter 212A up-samples and filters digital baseband Tx data 215A for DAC 214A to convert the digital baseband Tx data to an analog baseband Tx signal. In one or more embodiments, the analog signal from DAC 214A may be at an intermediate frequency (IF) if digital up-sample filter 212A digitally up-converts digital baseband Tx data 215A to the IF.

An analog frontend of aggressor transmitter A 202 receives the analog baseband Tx signal for up-conversion to an RF Tx signal. The analog frontend includes a BB analog module 216A, an RF up-converter 218A, a power amplifier (PA) 220A, and a duplexer 221A. BB analog module 216A filters, amplifies, and conditions the analog baseband Tx signal to generate a signal suitable for transmission over the communication channel. In one or more embodiments, BB analog module 216A may further condition the Tx signal for beamforming or for transmission over a MIMO channel. RF up-converter 218A up-converts the Tx signal from BB analog module 216A to the RF frequency band of the RF Tx signal. RF up-converter 218A may convert the Tx signal from baseband to the RF frequency band using a single-stage mixer or use a multi-stage up-conversion process involving several mixers and one or more IFs. The RF Tx signal may occupy the full bandwidth of the Tx channel or may occupy one or more sub-bands of the Tx channel. PA 220A amplifies the RF Tx signal to a desired power level and the amplified RF Tx signal is switched through duplexer 221A for transmission through an antenna 222A as a first RF Tx signal 224. Operation of the analog frontend may also be under the control of controller 208A. For example, controller 208A may determine the RF frequency band of the Tx channel, the sub-bands within the Tx channel, and the power level of the first RF Tx signal 224.

Aggressor transmitter B 204 has the same processing components as aggressor transmitter A 202. The components of aggressor transmitter B 204 are designated by the same reference numerals as those used in aggressor transmitter A 202 with the suffix changed to 'B'. In a MIMO transceiver, aggressor transmitter B 204 may be configured to transmit a second RF Tx signal 228 over the same frequency band as the first RF Tx signal 224 from aggressor transmitter A 202. In one or more embodiments, aggressor transmitter B 204 may transmit the second RF Tx signal 228 on a second uplink carrier of an uplink carrier aggregation system. The power levels of the two RF Tx signals may be different. Aggressor transmitter B 204 generates a digital baseband Tx data 215B that is routed as Tx data of aggressor transmitter B 204 to victim receiver 206 for reconstructing the interference signal from aggressor transmitter B 204 in NLIC operations.

Non-idealities in BB analog modules 216A/216B, RF up-converters 218A/218B, PAs 220A/220B, and/or duplexers 221A/221B may generate spectral re-growth of the first and second RF Tx signals 224/228 that overlap with the Rx frequency band received by victim receiver 206. For example, non-linearities in the amplifier or filter of BB analog modules 216A/216B, in one or more mixers of RF up-converters 218A/218B, and/or in the operating regions of PAs 220A/220B may introduce spectral re-growth in the first and second RF Tx signals 224/228. Linearities in PAs 220A/220B are a function of current consumption and the linear operating range of PAs 220A/220B may be reduced to obtain savings in power, area, and/or cost when performing design trade-off of the two aggressor transmitters. The result of the design trade-off may be to allow for some spectral re-growth when PAs 220A/220B are operated over the non-linear region. In one or more embodiments, if first RF Tx signal 224 has a RF carrier frequency of $f_0$, the third harmonic distortion (H3D) 226 of first RF Tx signal 224 may introduce undesired energy at $3f_0$, which may fall in the Rx frequency band of RF Rx signal 234 received by victim receiver 206. Similarly, if second RF Tx signal 228 also has a RF carrier frequency of $f_0$, the H3D 230 of second RF Tx signal 228 may also introduce interference on RF Rx signal 234 at $3f_0$. Other $m^{th}$ harmonic distortions of first and second RF Tx signals 224/228 may similarly introduce undesired energy at $m^{th}$ multiples of $f_0$, the cancellation of which also falls under the scope of the present disclosure.

Figure 2B:
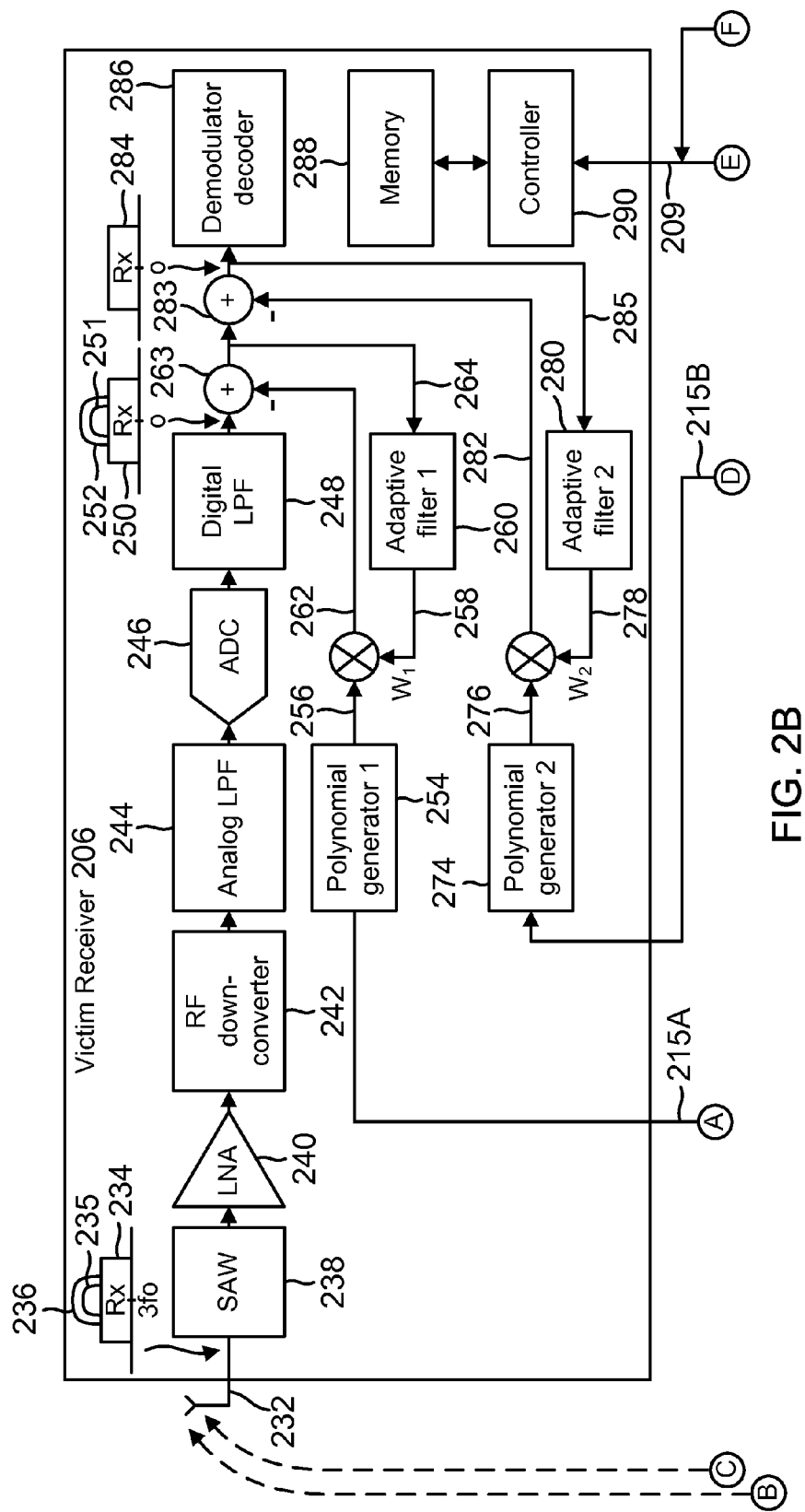
FIG. 2B shows a system block diagram of a victim receiver of a communication system in which the victim receiver implements cascaded NLIC operations using baseband Tx signals from the two aggressor transmitters of FIG. 2A to mitigate self-jamming interference according to one or more embodiments of the present disclosure.

FIG. 2B shows a system block diagram of a victim receiver of a communication system in which the victim receiver implements cascaded NLIC operations using baseband Tx signals from the two aggressor transmitters of FIG. 2A to mitigate self-jamming interference according to one or more embodiments of the present disclosure. Victim receiver 206 receives RF Rx signal 234 that is the desired Rx signal centered at Rx carrier frequency $f_{Rx}$ of $3f_0$ through antenna 232. Victim receiver 206 may receive self-jamming interference in the Rx frequency band due to the H3D 226 of first RF Tx signal 224 and the H3D 230 of second RF Tx signal 228 through antenna 232. The interference signals received by antenna 232 of victim receiver 206 due to the leakage of the H3D 226 of first RF Tx signal 224 and the H3D 230 of second RF Tx signal 228 are designated as first interference signal 236 and second interference signal 235, respectively. First interference signal 236 has a stronger interference level than second interference signal 235. In one or more embodiments, first interference signal 236 and second interference signal 235 may be received through other paths due to limited isolation between aggressor transmitter A 202 or aggressor transmitter B 204 and victim receiver 206.

An analog frontend of victim receiver 206 processes RF Rx signal 234 and its interference component that includes first interference signal 236 and second interference signal 235. The analog frontend includes a surface acoustical wave (SAW) filter 238, a low noise amplifier (LNA) 240, an RF down-converter 242, an analog low pass filter (LPF) 244, and an analog-to-digital converter (ADC) 246. Received RF Rx signal 234 and its interference component is filtered by SAW filter 238 and amplified by LNA 240. RF down-converter 242 down-converts the filtered and amplified Rx signal and its interference component from the RF frequency band (e.g., Rx carrier frequency $f_{Rx}$ of $3f_0$) down to baseband. RF down-converter 242 may perform the down conversion from RF to baseband using a single-stage mixer or through a multi-stage down-conversion process involving several mixers and one or more IFs. Analog LPF 244 filters, amplifies, and otherwise conditions the baseband signal from RF down-converter 242 and outputs an analog composite baseband Rx signal. ADC 246 digitizes the analog composite baseband Rx signal from analog LPF 244 to a digital baseband signal. In one or more embodiments, LPF 244 may output an analog composite Rx signal at IF and ADC 246 may further down-convert and digitize the analog composite Rx signal to a digital baseband signal.

Non-idealities in the Rx signal processing chain may generate co-channel interference even if first RF Tx signal 224 and second RF Tx signal 228 do not have spectral re-growth that overlaps with the Rx frequency band centered at $f_{Rx}$. For example, IM2 distortion of one or more mixers of RF down-converter 242 operating on leakage of first RF Tx signal 224 and second RF Tx signal 228 may introduce interference component to composite baseband Rx signal. First RF Tx signal 224 and second RF Tx signal 228 may leak to victim receiver 206 due to the large difference in signal power between first RF Tx signal 224/second RF TX signal 228 and RF Rx signal 234 and due to limited isolation between aggressor transmitter A 202/aggressor transmitter B 204 and victim receiver 206. Non-linearities in SAW filter 238, in LNA 240, and/or in analog LPF 244 operating on the leakage of first RF Tx signal 224 and second RF Tx signal 228 may also cause co-channel interference.

The digital baseband signal from ADC 246 is further filtered by a digital LPF 248 to generate a composite signal that contains a desired baseband Rx signal 250 and an interference component. The interference component includes a first interference baseband signal 252 and a second interference baseband signal 251. First interference baseband signal 252 and second interference baseband signal 251 are the baseband version of first interference signal 236 and second interference signal 235, respectively.

An NLIC module in victim receiver 206 reconstructs first interference baseband signal 252 and second interference baseband signal 251 by adaptively estimating the interference signals using digital baseband Tx data 215A from aggressor transmitter A 202 and digital baseband Tx data 215B from aggressor transmitter B 204, respectively. The NLIC module first estimates the stronger of the two interference signals and removes the estimate of the stronger interference signal from the composite signal that contains the desired baseband Rx signal 250 and the interference component. For example, a controller 290 determines the expected levels of interference caused by first interference baseband signal 252 and second interference baseband signal 251, and selects the stronger of the two interference signals to estimate and remove first.

The expected levels of interference from the two interference signals may depend on such factors as the power levels of first RF Tx signal 224 and second RF Tx signal 228 transmitted from the aggressor transmitters, the levels of antenna isolation from antennas 222A and 222B of the aggressor transmitters to antenna 232 of victim receiver 206, and the center frequency and bandwidth of first RF Tx signal 224 and second RF Tx signal 228, etc. Victim receiver 206 may receive the transmitted power levels of first RF Tx signal 224 and second RF Tx signal 228 from aggressor transmitter A 202 and aggressor transmitter B 204 through a data bus 209. Victim receiver 206 may also receive Tx information pertaining to the Tx carrier frequency (e.g., $f_0$), Tx sub-bands used, configuration information of the analog frontend of the aggressor transmitters, etc., through data bus 209. To obtain the antenna isolation information, victim receiver 206 may perform calibration tests between aggressor transmitter A 202 and victim receiver 206, and between aggressor transmitter B 204 and victim receiver 206 to measure the isolation data. From the Tx information and the isolation data, controller 290 determines that first interference baseband signal 252 causes stronger interference on desired baseband Rx signal 250. As such, the NLIC module first operates on digital baseband Tx data 215A from aggressor transmitter A 202 to estimate and remove first interference baseband signal 252.

The NLIC module estimates first interference baseband signal 252 as a weighted sum of polynomial terms of digital baseband Tx data 215A. Thus, the NLIC module applies a non-linear distortion to the Tx signal from an aggressor transmitter to construct an estimate of the interference caused by the Tx signal. A polynomial generator 1 module 254 generates polynomial terms 256 from digital baseband Tx data 215A. Polynomial terms 256 are weighed by weight estimate $W_1$ 258 from an adaptive filter 1 module 260 and summed to generate an estimated first interference baseband signal 262. A summer 263 subtracts estimated first interference baseband signal 262 from the composite signal that contains the desired baseband Rx signal 250 and the interference component to cancel or mitigate first interference baseband signal 252. Summer 263 generates a composite signal that contains the desired baseband Rx signal 250 and a residual 264 of the first interference baseband signal 252 after the NLIC operation. Adaptive filter 1 module 260 may minimize residual 264 using a minimum square error (MSE) algorithm to adaptively generate weight estimate $W_1$ 258. Thus, the NLIC module adaptively generates estimated first interference baseband signal 262 that closely approximates first interference baseband signal 252 to remove or mitigate first interference baseband signal 252.

After removing or mitigating first interference baseband signal 252, the NLIC module operates on digital baseband Tx data 215B from aggressor transmitter B 204 to estimate and remove second interference baseband signal 251. Similarly, the NLIC module estimates second interference baseband signal 251 as a weighted sum of polynomial terms of digital baseband Tx data 215B. A polynomial generator 2 module 274 generates polynomial terms 276 from digital baseband Tx data 215B. Polynomial terms 276 are weighed by weight estimate $W_2$ 278 from an adaptive filter 2 module 280 and summed to generate an estimated second interference baseband signal 282. A summer 283 subtracts estimated second interference baseband signal 282 from the composite signal that contains the desired baseband Rx signal 250 and residual 264 of the first interference baseband signal 252 to cancel or mitigate second interference baseband signal 251. Summer 283 generates a signal 284 that contains the desired baseband Rx signal 250 and residual 264 of first interference baseband signal 252 and a residual 285 of second interference baseband signal 251 after the NLIC operation. Adaptive filter 2 module 280 may minimize residual 285 using an MSE algorithm to adaptively generate weight estimate $W_2$ 278. Thus, the NLIC module adaptively generates estimated second interference baseband signal 282 that closely approximates second interference baseband signal 251 to remove or mitigate second interference baseband signal 251.

A demodulator—decoder module 286 demodulates, de-interleaves, and decodes signal 284 to recover Tx data received in desired baseband Rx signal 250 under the control of controller 290. Controller 290 may execute instructions stored in a memory 288 to configure demodulator-decoder module 286 with Tx parameters such as the coding scheme, coding rate, modulation scheme, etc., used by the Tx data.

Figure 3:
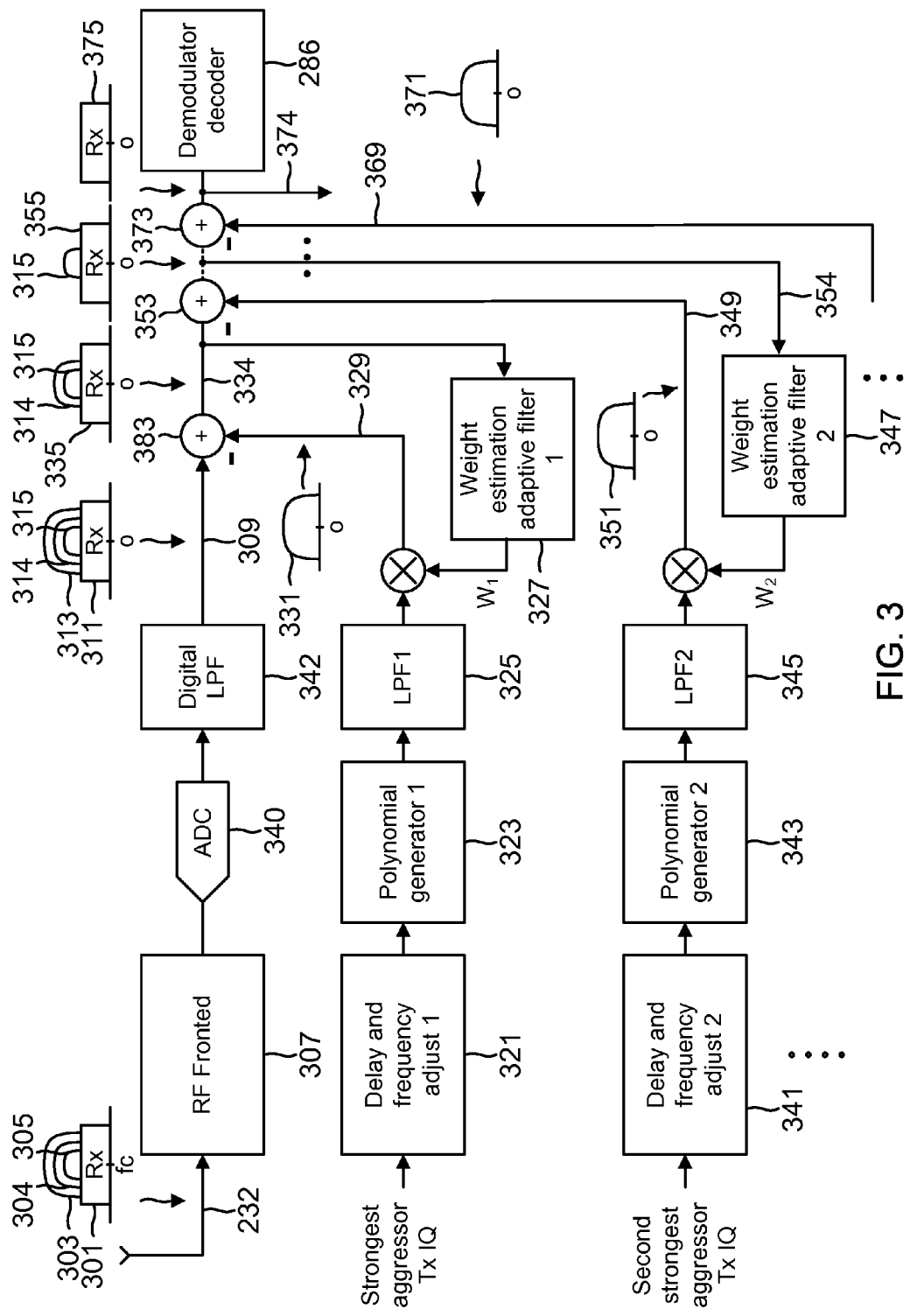
FIG. 3 shows a system block diagram used to implement cascaded NLIC operations in a victim receiver to remove or mitigate multiple self-jamming interference signals according to one or more embodiments of the present disclosure.

FIG. 3 shows a system block diagram used to implement cascaded NLIC operations in a victim receiver to remove or mitigate multiple self-jamming interference signals according to one or more embodiments of the present disclosure. The victim receiver may be a victim receiver of FIG. 2B when there is self-jamming interference from two aggressor transmitters.

The victim receiver receives desired RF Rx signal 301 centered at Rx carrier frequency $f_c$ through antenna 232. The victim receiver also receives an interference component that includes self-jamming interference in the Rx frequency band from multiple aggressor transmitters designated as interference signals 303, 304, and 305. Interference signal 303 has stronger interference on desired RF Rx signal 301 than interference signal 304, which has stronger interference on desired RF Rx signal 301 than interference signal 305. An RF frontend 307, ADC 340, and digital LPF 342 processes, digitizes, and filters desired RF Rx signal 301 and the interference component to generate a digital composite baseband signal 309. Digital composite baseband signal 309 contains a desired baseband Rx signal 311 and an interference component that includes interference signals 313, 314, and 315. Interference signals 313, 314, and 315 are the baseband or near-baseband version of interference signals 303, 304, and 305, respectively, in the Rx frequency band.

The cascaded NLIC operations of the interference signals are ordered based on the expected level of interference on desired baseband Rx signal 311 from the interference signals. A processor of the victim receiver may determine the expected level of interference on desired baseband Rx signal 311 based on Tx parameters such as the Tx power, the carrier frequency, and the bandwidth of the Tx signals from the aggressor transmitters, and system characteristics such as the antenna isolation from the aggressor transmitters to the victim receiver, etc. Each of the aggressor transmitters may communicate its Tx parameters to the victim receiver through a common data bus between the aggressor transmitters and the victim receiver. The victim receiver may determine the antenna isolation between the aggressor transmitters and the victim receiver through a system calibration procedure. The processor may determine the amount of interference power from each of the interference signals that is expected to overlap with the power of desired baseband Rx signal 311 in the received signal bandwidth. The victim receiver prioritizes the NLIC operations of the interference signals based on the order of the amount of the interference power overlapping the received signal power from the interference signals. If the Tx parameters from any of the aggressor transmitters change, the processor may re-determine the expected level of interference from the interference signals to reprioritize the NLIC operations of the interference signals.

Once the order of NLIC operations is determined, the victim receiver processes the digital Tx baseband signal (i.e., Tx IQ signals) from the strongest aggressor transmitter to estimate strongest interference signal 313. The victim receiver may use a delay-and-frequency-adjust 1 module 321 to insert programmable delays into the digital Tx baseband signal from the strongest aggressor transmitter to sample align the estimate of the strongest interference signal generated from the NLIC operation with strongest interference signal 313 contained in digital composite baseband signal 309. Delay-and-frequency-adjust 1 module 321 may also frequency adjust the digital Tx baseband signal from the strongest aggressor transmitter to remove any frequency offset between the digital Tx baseband signal from the strongest aggressor transmitter and strongest interference signal 313.

A polynomial generator 1 module 323 reconstructs the non-linear components of strongest interference signal 313 using the delayed and frequency adjusted digital Tx baseband signal from the strongest aggressor transmitter. For example, polynomial generator 1 module 323 may generate the second power and the fourth power of the digital Tx baseband signal. In one or more embodiments, polynomial generator 1 module 323 may also generate linear components of the digital Tx baseband signal. The victim receiver may estimate strongest interference signal 313 by low-pass filtering (i.e., using LPF 1 module 325) and weighing the non-linear components from polynomial generator 1 module 323 using weight estimates $W_1$ from a weight estimation adaptive filter 1 module 327. The victim receiver may sum the weighted non-linear components to generate an estimated strongest interference signal 329. In one or more embodiments, estimated strongest interference signal 329 may also contain a weighted linear component. Estimated strongest interference signal 329 may have estimated interference power centered at the baseband as shown in 331.

A summer 383 subtracts estimated strongest interference signal 329 from digital composite baseband signal 309 to generate a signal 334. Signal 334 contains desired baseband Rx signal 311 and a residual of strongest interference signal 313, collectively designated as signal 335, and an interference component that includes interference signals 314 and 315. Weight estimation adaptive filter 1 module 327 may adaptively change weight estimates $W_1$ to minimize the residual of strongest interference signal 313 contained in signal 334 using a minimum square error (MSE) algorithm. The MSE algorithm may be implemented as a least mean square (LMS) algorithm, recursive least square (RLS) algorithm, etc. Thus, the NLIC operation adaptively generates estimated strongest interference signal 329 that closely approximates the received strongest interference signal 313 to remove or mitigate strongest interference signal 313 from digital composite baseband signal 309.

After removing or mitigating strongest interference signal 313 from digital composite baseband signal 309, the NLIC operation on second strongest interference signal 314 is performed. The victim receiver processes the digital Tx baseband signal (i.e., Tx IQ signals) from the second strongest aggressor transmitter to estimate second strongest interference signal 314. The victim receiver may use a delay-and-frequency-adjust 2 module 341 to sample align and frequency adjust the digital Tx baseband signal from the second strongest aggressor transmitter with second strongest interference signal 314 contained in signal 334. The programmed delay and frequency adjustment in delay-and-frequency-adjust 2 module 341 may be different from those in delay-and-frequency-adjust 1 module 321 because of the different propagation paths and frequency offsets of the multiple interference signals.

Similar to the NLIC operation to remove or mitigate strongest interference signal 313, a polynomial generator 2 module 343, a LPF 2 module 345, and weight estimates $W_2$ from a weight estimation adaptive filter 2 module 347 are used to generate an estimated second strongest interference signal 349. Polynomial generator 2 module 343 may have different non-linear components (i.e., polynomials) from those in polynomial generator 2 module 323. Estimated second strongest interference signal 349 may have estimated interference power centered at the baseband as shown in 351. A summer 353 subtracts estimated second strongest interference signal 349 from signal 334 to generate a signal 354. Signal 354 contains desired baseband Rx signal 311, a residual of strongest interference signal 313, and a residual of second strongest interference signal 314, collectively designated as signal 355, and an interference component that includes interference signal 315. Weight estimation adaptive filter 2 module 347 may adaptively change weight estimates $W_2$ to minimize the residual of second strongest interference signal 314 contained in signal 354 using a minimum square error (MSE) algorithm. Thus, the NLIC operation adaptively generates estimated second strongest interference signal 349 that closely approximates the received second strongest interference signal 314 to remove or mitigate second strongest interference signal 314 from digital composite baseband signal 309.

The victim receiver performs NLIC operation on the next strongest interference signal and so on until all interference signals have been removed or mitigated from digital composite baseband signal 309. FIG. 3 shows a last summer 373 that is used to subtract an estimated weakest interference signal 369 from a signal that contains desired baseband Rx signal 311, a residual of all other interference signal, and a weakest interference signal to generate signal 375. Signal 375 contains desired baseband Rx signal 311 and the residuals of all interference signals. A residual 374 of the weakest interference signal is minimized in an MSE algorithm to generate estimated weakest interference signal 369. Estimated weakest interference signal 369 closely approximates the received weakest interference signal and may have estimated interference power centered at the baseband as shown in 371. A demodulator-decoder module 286 demodulates and decodes signal 375 to recover Tx data received in desired baseband Rx signal 311.

The NLIC operations may process the digital Tx baseband signals from the strongest to the weakest aggressor transmitters on a sample by sample basis. In one or more embodiments, the NLIC operations may process the digital Tx baseband signals in blocks. For example, the victim receiver may buffer a block of samples of the digital Tx baseband signal from each aggressor transmitter. The NLIC operations may process the block of buffered Tx baseband signal from an aggressor transmitter to estimate the interference signal from that aggressor transmitter. The NLIC operations may remove the estimated interference signal from a block of Rx signal before processing the block of buffered Tx baseband signal from the next aggressor transmitter. The polynomial generators for the interference signals may be different to reconstruct non-linear components of the interference signals that may have different orders of non-linearities from the multiple aggressor transmitters. Similarly, the number of taps in the weight estimation adaptive filters may be different for interference signals generated from the aggressor transmitters by different mechanism and having different levels of interference power. The cascaded NLIC operations may be scaled for different numbers of interference signals. By ordering NLIC processing of the interference signals from the strongest interference signal to the weakest, the performance of the NLIC operations may remain robust even when there are a large number of interference signals or when the number of interference signals changes.

Figure 4:
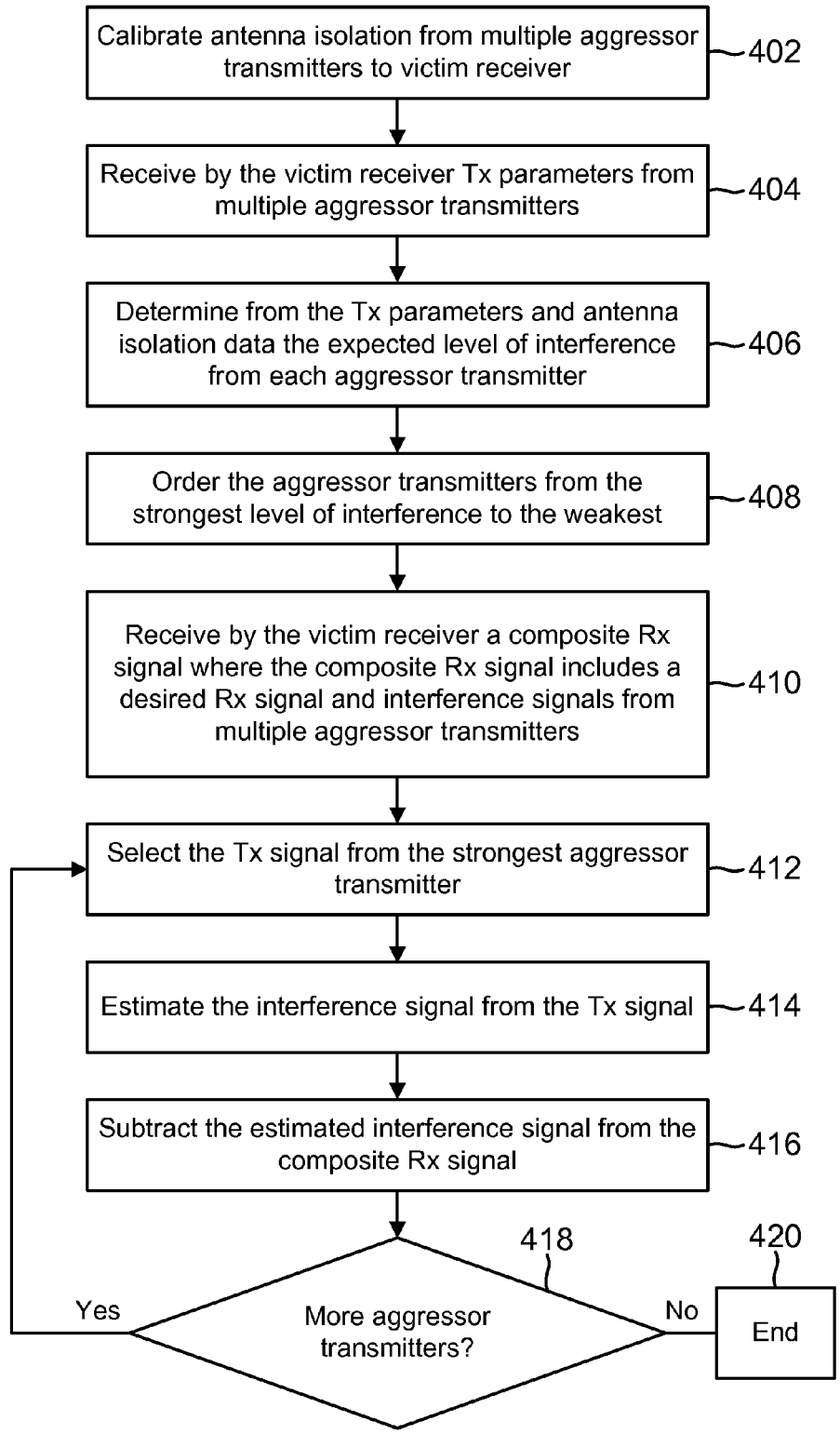
FIG. 4 shows a flow chart of a process for cascaded NLIC operations to successively estimate and remove interference signals from the strongest interference signal to the weakest in a victim receiver of a communication system according to one or more embodiments of the present disclosure.

FIG. 4 shows a flow chart of a process for cascaded NLIC operations to successively estimate and remove interference signals from the strongest interference signal to the weakest in a victim receiver of a communication system according to one or more embodiments of the present disclosure.

In 402, the victim receiver calibrates the level of antenna isolation from multiple aggressor transmitters to the victim receiver. The victim receiver may transmit a signal of known Tx power from only one aggressor transmitter in the absence of transmission of the desired Rx signal and may measure the Rx power in the signal band normally occupied by the desired Rx signal in a calibration test. The victim receiver may measure the ratio between the Tx power and the Rx power to obtain the antenna isolation from the transmitting aggressor transmitter to the victim receiver.

In 404, the victim receiver receives the Tx parameters from the multiple aggressor transmitters. The Tx parameters from each aggressor transmitter may include the Tx power, the Tx carrier frequency, the bandwidth of the Tx signal, the Tx sub-bands used, configuration information of the analog frontend of the aggressor transmitter, etc. The aggressor transmitter may transmit the Tx parameters to the victim receiver through a system data bus.

In 406, the victim receiver determines from the Tx parameters and the antenna isolation data the expected level of interference on the desired Rx signal from each aggressor transmitter. For example, for each aggressor transmitter, the victim receiver may determine the amount of interference power from the interference signal that is expected to overlap with the desired signal in the received signal bandwidth.

In 408, the victim receiver orders the aggressor transmitters based on the expected levels of interference on the desired Rx signal from the strongest to the weakest. The victim receiver uses the order to prioritize the NLIC operations of the interference signal from the aggressor transmitters.

In 410, the victim receiver receives a composite Rx signal where the composite Rx signal includes a desired Rx signal and interference signals from the multiple aggressor transmitters. The composite Rx signal may be down-converted from an RF frequency down to baseband for NLIC processing. The interference signals may be due to non-linearities in the RF components of the Tx chains of the aggressor transmitters or in the RF components of the Rx chain of the victim receiver.

In 412, the victim receiver receives from the aggressor transmitters the known Tx data transmitted from the aggressor transmitters. The victim receiver selects the known Tx data from the aggressor transmitter that is expected to cause the strongest interference on the desired Rx signal as determined from 408. The known Tx data may be digital Tx baseband signal such as Tx IQ signal received from a digital backend of each aggressor transmitter.

In 414, the victim receiver estimates the interference signal received from the selected aggressor transmitter using the known Tx data from the selected aggressor transmitter. The victim receiver may reconstruct the received interference signal due to the Tx/Rx non-linearities as a weighted sum of polynomial terms of the known Tx data.

In 416, the victim receiver removes or mitigates the estimated interference signal from the composite Rx signal. The victim receiver may subtract the estimated interference signal from the composite Rx signal to generate a signal that contains the desired Rx signal, a residual of the interference signal from the selected aggressor transmitter, and interference signals from the other aggressor transmitters. The victim receiver may minimize the residual of the interference signal from the selected aggressor transmitter using a MSE algorithm to generate an estimate of the interference signal that closely approximates the received interference signal.

In 418, the victim receiver determines if there is any more interference signal to estimate and remove from the composite Rx signal. If there is, the victim receiver selects the known Tx data from the aggressor transmitter that is expected to cause the next strongest interference on the desired Rx signal as determined from 408. The victim receiver repeats 412, 414, and 416 to estimate the received interference signal from the selected aggressor transmitter and to remove or mitigate the estimated interference signal from the composite Rx signal until interference signals from multiple aggressor transmitters have been removed or mitigated.

It is contemplated that the methods identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It is also contemplated that various embodiments provided by the present disclosure may be implemented using hardware, firmware, software, or any combinations thereof. For example, the various modules of the analog frontends or the digital backend of FIG. 2A, 2B, or 3 may be implemented by one or more processors, including but not limited to controllers and/or other processing components internal or external to the aggressor transmitter or victim receiver. The processors may include a micro-controller, digital signal processor (DSP), or other processing components. The processors may perform specific operations by executing one or more sequences of instructions contained in system memory. Logic may be encoded in a computer readable medium, which may refer to any medium that participates in providing instructions to processors for execution. Such a medium may take many forms, including but not limited to, non-volatile media, volatile media, and transmission media. In one embodiment, logic is encoded in non-transitory computer readable medium.

Although embodiments of the present disclosure have been described, these embodiments illustrate but do not limit the disclosure. For example, embodiments of the present disclosure may encompass other types of self-jamming interference introduced by the Tx and/or Rx chains of multiple aggressor transmitters and victim receiver (e.g., other harmonics of the RF Tx signal, higher orders of intermodulation interference, or cross modulation of the RF Tx with other Tx frequencies or jammers). It should also be understood that embodiments of the present disclosure should not be limited to these embodiments but that numerous modifications and variations may be made by one of ordinary skill in the art in accordance with the principles of the present disclosure and be included within the scope of the present disclosure as hereinafter claimed.

What is claimed is:

1. A method for mitigating self-jamming interference in a communication system, the method comprising:
   determining, for a victim receiver, an expected level of interference from each of a plurality of aggressor transmitters, wherein the expected level of interference from an aggressor transmitter of the plurality of aggressor transmitters is based, at least in part, on a measurement of antenna isolation from the aggressor transmitter to the victim receiver;
   ordering the plurality of aggressor transmitters from a strongest aggressor transmitter having a highest expected level of interference to a weakest aggressor transmitter having a lowest expected level of interference;
   receiving a composite receive (Rx) signal, wherein the composite Rx signal comprises a desired Rx signal and interference from the plurality of aggressor transmitters;
   receiving a transmit (Tx) signal from the strongest aggressor transmitter; and
   performing non-linear interference cancellation (NLIC) of the Tx signal to mitigate the interference in the composite Rx signal.

2. The method of claim 1, further comprising:
   receiving a respective Tx signal from each of the plurality of aggressor transmitters; and
   performing NLIC of the respective Tx signal from each of the plurality of aggressor transmitters to mitigate the interference in the composite Rx signal, wherein NLIC is performed successively based on said ordering of the plurality of aggressor transmitters.

3. The method of claim 2, wherein said performing NLIC of the respective Tx signal comprises:
   constructing an estimated interference signal using the respective Tx signal; and
   removing the estimated interference signal from the composite Rx signal.

4. The method of claim 3, wherein said constructing the estimated interference signal comprises:
   constructing one or more non-linear components from the respective Tx signal; and generating a weighted sum of the one or more non-linear components with corresponding weight estimates in an adaptive filter to generate the estimated interference signal.

5. The method of claim 2, wherein said performing NLIC of the respective Tx signal comprises generating a post-NLIC Rx signal, wherein the post-NLIC Rx signal comprises the desired Rx signal and a residual of the interference after the NLIC of the respective Tx signal.

6. The method of claim 5, further comprising processing the post-NLIC Rx signal to recover the desired Rx signal.

7. The method of claim 2, wherein said performing NLIC of the respective Tx signal comprises performing NLIC on a sample by sample basis.

8. The method of claim 2, wherein said performing NLIC of the respective Tx signal comprises performing NLIC of a block of samples of the respective Tx signal.

9. The method of claim 1, further comprising:
updating said determining of the expected level of interference from each of the plurality of aggressor transmitters when a number of the aggressor transmitters changes;
updating said ordering of the plurality of aggressor transmitters from an updated strongest aggressor transmitter to an updated weakest aggressor transmitter; and
performing NLIC of the Tx signal from the updated strongest aggressor transmitter to mitigate the interference in the composite Rx signal.

10. The method of claim 1, wherein said determining the expected level of interference from each of the plurality of aggressor transmitters comprises:
determining the measurement of antenna isolation from the aggressor transmitter to the victim receiver;
receiving Tx parameters from the aggressor transmitter; and
determining the expected level of interference on the victim receiver from the aggressor transmitter based, at least in part, on the measurement of antenna isolation and the Tx parameters.

11. The method of claim 10, further comprising:
receiving a new Tx parameters from a first aggressor transmitter of the plurality of aggressor transmitters;
updating said determining the expected level of interference from the first aggressor transmitter using the new Tx parameters; and
updating said ordering of the plurality of aggressor transmitters from an updated strongest aggressor transmitter to an updated weakest aggressor transmitter.

12. The method of claim 10, wherein determining the measurement of antenna isolation from the aggressor transmitter to the victim receiver comprises:
performing a calibration test in which the aggressor transmitter transmits a test Tx signal of known Tx power in absence of the desired Rx signal and the victim receiver measures a test Rx power in a signal band normally occupied by the desired Rx signal; and
determining a ratio between the test Tx power and the test Rx power.

13. The method of claim 10, wherein receiving Tx parameters from the aggressor transmitter comprises receiving Tx parameters via a common data bus between the aggressor transmitter and the victim receiver.

14. An apparatus, comprising:
a victim receiver;
a plurality of aggressor transmitters;
a processor; and
a memory having instructions stored therein which, when executed by the processor, cause the apparatus to:
determine, for the victim receiver, an expected level of interference from each of the plurality of aggressor transmitters, wherein the expected level of interference from an aggressor transmitter of the plurality of aggressor transmitters is based, at least in part, on as measurement of antenna isolation from the aggressor transmitter to the victim receiver;
order the plurality of aggressor transmitters from a strongest aggressor transmitter having a highest expected level of interference to a weakest aggressor transmitter having a lowest expected level of interference;
receive a composite receive (Rx) signal, wherein the composite Rx signal comprises a desired Rx signal and interference from the plurality of aggressor transmitters;
receive a transmit (Tx) signal from the strongest aggressor transmitter; and
perform non-linear interference cancellation (NLIC) of the Tx signal to mitigate the interference in the composite Rx signal.

15. The apparatus of claim 14, wherein the instructions, when executed by the processor, further cause the apparatus to:
receive a respective Tx signal from each of the plurality of aggressor transmitters; and
perform NLIC of the respective Tx signal from each of the plurality of aggressor transmitters to mitigate the interference in the composite Rx signal, wherein NLIC is performed successively based on said order of the plurality of aggressor transmitters.

16. The apparatus of claim 15, wherein the instructions to perform NLIC of the respective Tx signal comprise instructions that, when executed by the processor, cause the apparatus to:
construct an estimated interference signal from the respective Tx signal; and
remove the estimated interference signal from the composite Rx signal.

17. The apparatus of claim 16, wherein the instructions to construct the estimated interference signal comprise instructions that, when executed by the processor, cause the apparatus to:
construct one or more non-linear components from the respective Tx signal; and
generate a weighted sum of the one or more non-linear components with corresponding weight estimates in an adaptive filter to generate the estimated interference signal.

18. The apparatus of claim 15, wherein the instructions to perform NLIC of the respective Tx signal comprise instructions that, when executed by the processor, cause the apparatus to generate a post-NLIC Rx signal, wherein the Rx signal comprises the desired Rx signal and a residual of the interference after the NLIC of the respective Tx signal.

19. The apparatus of claim 18, wherein the instructions, when executed by the processor, further cause the apparatus to process the post-NLIC Rx signal to recover the desired Rx signal.

20. The apparatus of claim 15, wherein the instructions to perform NLIC of the respective Tx signal comprise instructions that, when executed by the processor, cause the apparatus to perform NLIC on a sample by sample basis.

21. The apparatus of claim 15, wherein the instructions to perform NLIC of the respective Tx signal comprise instructions that, when executed by the processor, cause the apparatus to perform NLIC of a block of samples of the respective Tx signal.

22. The apparatus of claim 14, wherein the instructions, when executed by the processor, further cause the apparatus to:
update the expected level of interference from each of the plurality of aggressor transmitters when a number of the aggressor transmitters changes;
update the order of the plurality of aggressor transmitters from an updated strongest aggressor transmitter to an updated weakest aggressor transmitter; and
perform NLIC of the Tx signal from the updated strongest aggressor transmitter to mitigate the interference in the composite Rx signal.

23. The apparatus of claim 14, wherein the instructions to determine the expected level of interference from each of the plurality of aggressor transmitters comprise instructions that, when executed by the processor, cause the apparatus to:
determine the measurement of antenna isolation from the aggressor transmitter to the apparatus;
receive Tx parameters from the aggressor transmitter; and
determine the expected level of interference on the apparatus from the aggressor transmitter based, at least in part, on the measurement of antenna isolation and the Tx parameters.

24. The apparatus of claim 23, wherein the instructions, when executed by the processor, further cause the apparatus to:
receive a new Tx parameters from a first aggressor transmitter of the plurality of aggressor transmitters;
update the expected level of interference from the first aggressor transmitter based on the new Tx parameters; and
update the order of the plurality of aggressor transmitters from an updated strongest aggressor transmitter to an updated weakest aggressor transmitter.

25. The apparatus of claim 23, wherein the instructions to determine the measured antenna isolation comprise instructions that, when executed by the processor, cause the apparatus to:
perform a calibration test in which the aggressor transmitter transmits a test Tx signal of known Tx power in absence of the desired Rx signal and the victim receiver measures a test Rx power in a signal band normally occupied by the desired Rx signal; and
determine a ratio between the test Tx power and the test Rx power.

26. The apparatus of claim 23, further comprising:
a common data bus between the aggressor transmitter and the victim receiver, and
wherein the instructions to receive the Tx parameters from the aggressor transmitter comprise instructions that, when executed by the processor, cause the apparatus to receive the Tx parameters via the common data bus.

27. A non-transitory machine-readable medium comprising instructions which, when executed by a processor, are adapted to cause the processor to perform operations comprising:
determining, for a victim receiver, an expected level of interference from each of a plurality of aggressor transmitters, wherein the expected level of interference from an aggressor transmitter of the plurality of aggressor transmitters is based, at least in part, on a measurement of antenna isolation from the aggressor transmitter to the victim receiver;
ordering the plurality of aggressor transmitters from a strongest aggressor transmitter having a highest expected level of interference to a weakest aggressor transmitter having a lowest expected level of interference;
receiving a composite receive (Rx) signal, wherein the composite Rx signal comprises a desired Rx signal and interference from the plurality of aggressor transmitters;
receiving a transmit (Tx) signal from the strongest aggressor transmitter; and
performing non-linear interference cancellation (NLIC) of the Tx signal to mitigate the interference in the composite Rx signal.

28. The non-transitory machine-readable medium of claim 27, wherein the operations further comprise:
receiving a respective Tx signal from each of the plurality of aggressor transmitters; and
performing NLIC operation of the respective Tx signal from each of the plurality of aggressor transmitters to mitigate the interference in the composite Rx signal, wherein NLIC is performed successively based on said ordering of the plurality of aggressor transmitters.

29. The non-transitory machine-readable medium of claim 27, wherein the operations further comprise:
updating said determining of the expected level of interference from each of the plurality aggressor transmitters when a number of the aggressor transmitters changes;
updating said ordering of the plurality of aggressor transmitters from an updated strongest aggressor transmitter to an updated weakest aggressor transmitter; and
performing NLIC of the Tx signal from the updated strongest aggressor transmitter to mitigate the interference in the composite Rx signal.

30. The non-transitory machine-readable medium of claim 27, wherein said determining the expected level of interference from each of the plurality of aggressor transmitters comprises:
determining the measurement of antenna isolation from the aggressor transmitter to the victim receiver;
receiving Tx parameters from the aggressor transmitter; and
determining the expected level of interference on the victim receiver from the aggressor transmitter based, at least in part, on the measurement of antenna isolation and the Tx parameters.

31. The non-transitory machine-readable medium of claim 30, wherein the operations further comprise:
receiving a new Tx parameters from aa first aggressor transmitter of the plurality of aggressor transmitters;
updating said determining the expected level of interference from the first aggressor transmitter using the new Tx parameters; and
updating said ordering of the plurality of aggressor transmitters from an updated strongest aggressor transmitter to an updated weakest aggressor transmitter.

32. A system, comprising:
means for determining, for a victim receiver, an expected level of interference from each of a plurality of aggressor transmitters, wherein the expected level of interference from an aggressor transmitter of the plurality of aggressor transmitters is based, at least in part, on a measurement of antenna isolation from the aggressor transmitter to the victim receiver;
means for ordering the plurality of aggressor transmitters from a strongest aggressor transmitter having a highest expected level of interference to a weakest aggressor transmitter having a lowest expected level of interference;

means for receiving a composite receive (Rx) signal, wherein the composite Rx signal comprises a desired Rx signal and interference from the plurality of aggressor transmitters;

means for receiving a transmit (Tx) signal from the strongest aggressor transmitter; and means for performing non-linear interference cancellation (NLIC) of the Tx signal to mitigate the interference in the composite Rx signal.

33. The system of claim 32, further comprising:

means for receiving a respective Tx signal from each of the plurality of aggressor transmitters; and means for performing NLIC of the respective Tx signal from each of the plurality aggressor transmitters to mitigate the interference in the composite Rx signal, wherein the NLIC is performed successively based on said ordering of the plurality of aggressor transmitters.

34. The system of claim 32, further comprising:

means for updating said determining of the expected level of interference from each of the plurality of aggressor transmitters when a number of the aggressor transmitters changes;

means for updating said ordering of the plurality of aggressor transmitters from an updated strongest aggressor transmitter to an updated weakest aggressor transmitter; and means for performing NLIC of the Tx signal from the updated strongest aggressor transmitter to mitigate the interference in the composite Rx signal.

35. The system of claim 32, wherein the means for determining the expected level of interference from each of the plurality of aggressor transmitters comprises:

means for determining the measurement of antenna isolation from the aggressor transmitter to the system;

means for receiving Tx parameters from the aggressor transmitter; and means for determining the expected level of interference on the system from the aggressor transmitter based, at least in part, on the measurement of antenna isolation and the Tx parameters.

36. The system of claim 35, further comprising:

means for receiving a new Tx parameters from a first aggressor transmitter of the plurality of aggressor transmitters;

means for updating said determining the expected level of interference from the first aggressor transmitter using the new Tx parameters; and means for updating said ordering of the plurality of aggressor transmitters from an updated strongest aggressor transmitter to an updated weakest aggressor transmitter.

* * * * *